(No Model.) 3 Sheets—Sheet 1.
R. P. CORY.
REVOLVING FIRE ARM.
No. 245,792. Patented Aug. 16, 1881.
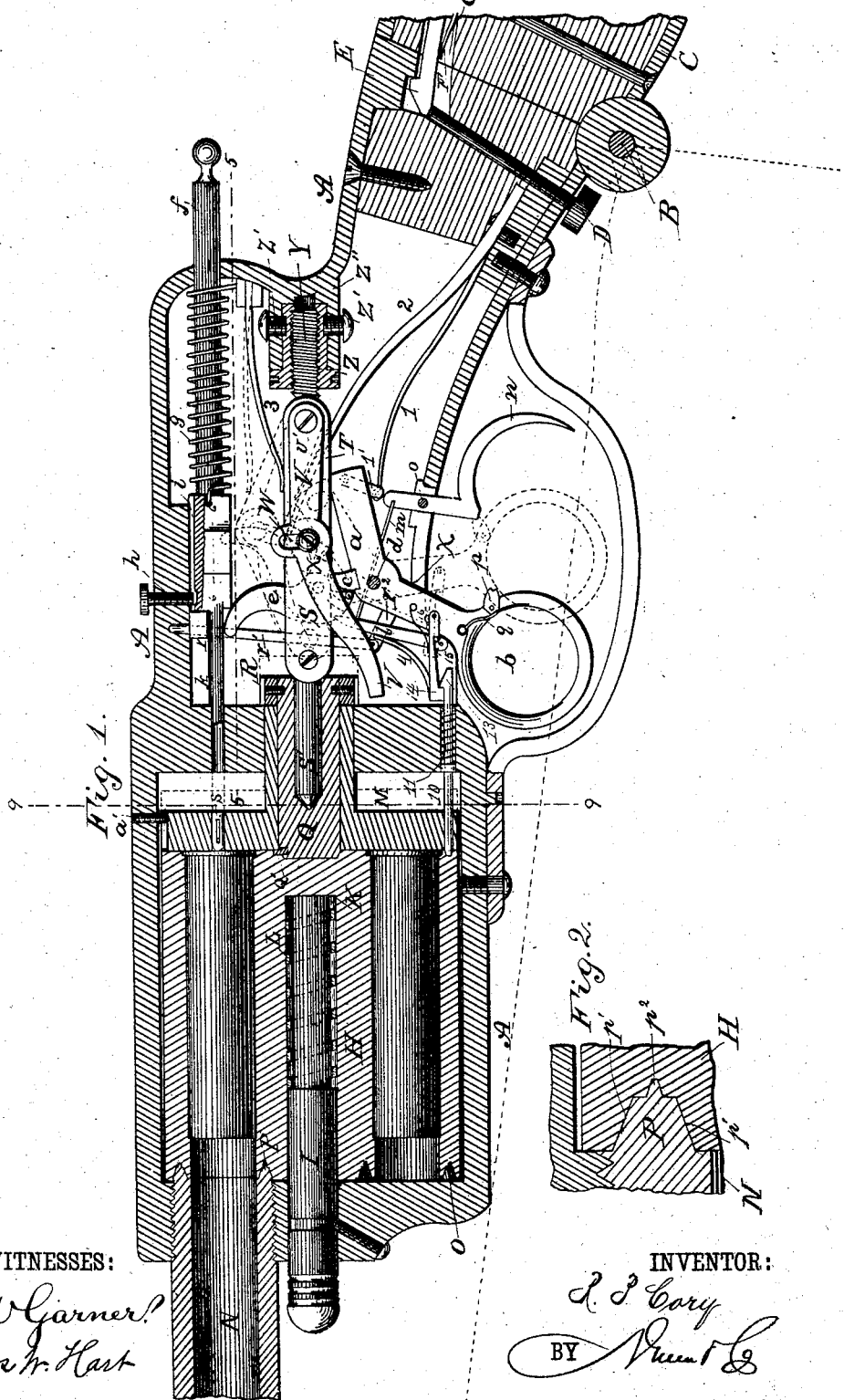
WITNESSES: INVENTOR:
R. P. Cory
BY
ATTORNEYS.

(No Model.)

R. P. CORY.
REVOLVING FIRE ARM.

No. 245,792. Patented Aug. 16, 1881.

WITNESSES:
J. W. Garner
Amos W. Hart

INVENTOR:
R. P. Cory
BY
ATTORNEYS.

(No Model.)　　　　　　　　　　　　　　　　　　　3 Sheets—Sheet 3.
R. P. CORY.
REVOLVING FIRE ARM.
No. 245,792.　　　　　　　　　Patented Aug. 16, 1881.
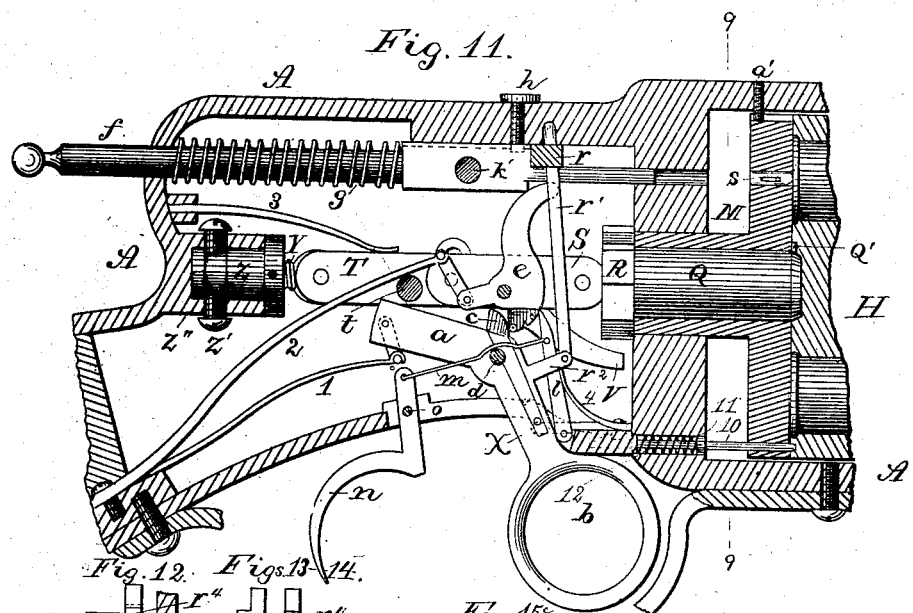
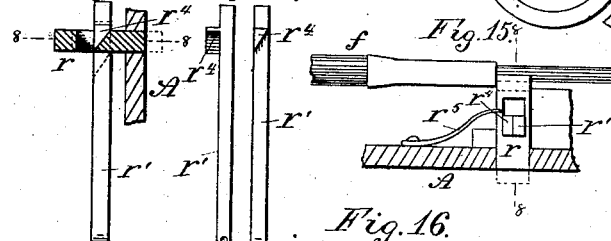
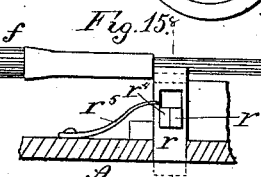
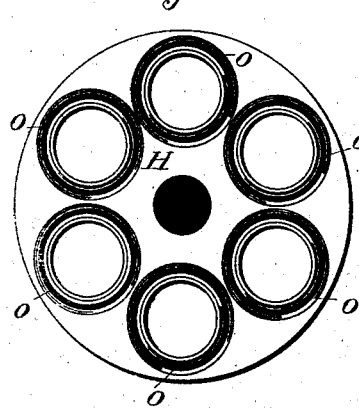
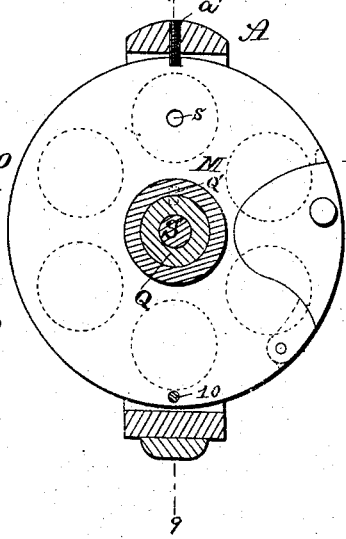
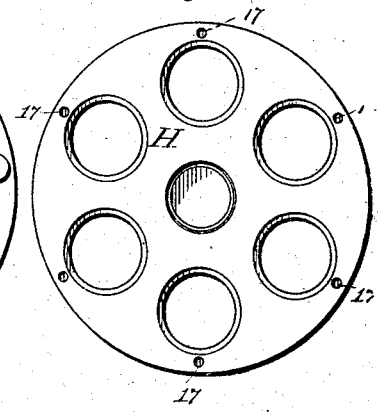
WITNESSES:　　　　　　　　　　　　　　　　　INVENTOR:
J. W. Garner　　　　　　　　　　　　　　　　　R. P. Cory
Amos W. Hatt　　　　　　　　　　　　　　BY
　　　　　　　　　　　　　　　　　　　　　　ATTORNEYS.

UNITED STATES PATENT OFFICE.

RANDOLPH P. CORY, OF UNION CITY, INDIANA.

REVOLVING FIRE-ARM.

SPECIFICATION forming part of Letters Patent No. 245,792, dated August 16, 1881.

Application filed February 21, 1881. (No model.)

*To all whom it may concern:*

Be it known that I, RANDOLPH P. CORY, of Union City, in the county of Randolph and State of Indiana, have invented a new and useful Improvement in Revolving Fire-Arms; and I do hereby declare that the following is a full, clear, and exact description of the same.

My invention is an improvement in that class of revolving fire-arms in which a chambered cylinder is adapted to slide as well as revolve on a horizontal axis and is forced up against the barrel just previous to each discharge.

The object of my invention is to provide an improved arm for sporting and army use, and which may be employed either for shot or ball, as occasion may require. The chief objection to revolving fire-arms of this kind has been the liability of the escape of gas laterally between the cylinder and barrel when the gun was discharged. Various attempts have been made to remedy the defect, but, so far as I am aware, without success. I have surmounted the difficulty by an improved form of joint between the cylinder and barrel, and by improved mechanism for operating and locking the cylinder, as hereinafter described.

My improved mechanism is so constructed that all the operations incident to firing the gun may be caused or performed by simply pulling the trigger, so that the gun may be fired rapidly until all the cylinder-chambers have been discharged without removing it from the shoulder—a great advantage in pop-shooting or shooting on the wing, as well as in various other cases. The mechanism is, however, adapted to allow one or more chambers to be discharged at leisure when desired. An improved stop mechanism connected with the hammer or firing-pin renders the gun absolutely safe from accidental discharge.

I will proceed to describe the invention by reference to the accompanying drawings, in which—

Figure 3:
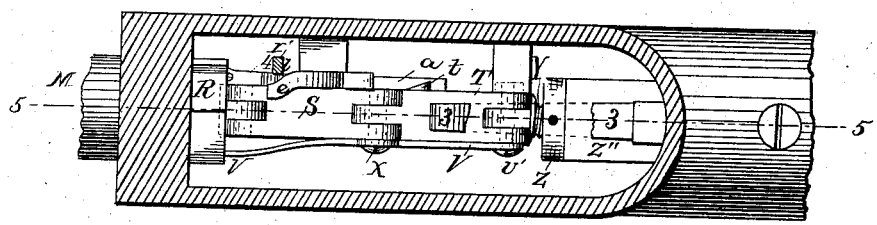
Figure 4:
Figure 5:
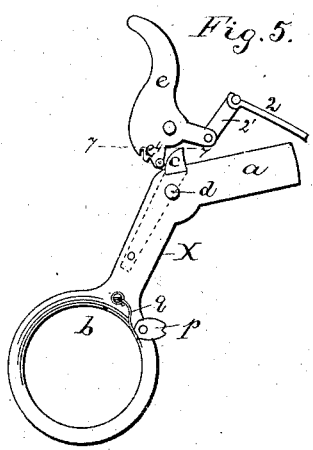
Figure 6:
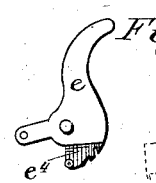
Figure 7:
Figure 8:
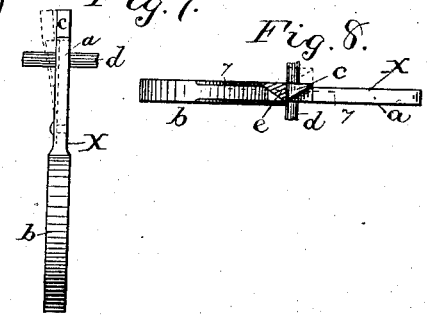

Figure 1 is a longitudinal vertical section of the gun, save the outer extremities of the stock and barrel. Fig. 2 is a detail longitudinal section, enlarged, showing the joint between the barrel and cylinder. Fig. 3 is a horizontal section of the lock and cylinder operating mechanism on line 5 5, Fig. 1. Figs. 4, 5, 6, 7, 8, 9, 10 are detail views, which will be hereinafter specifically referred to. Fig. 11 is a longitudinal vertical section of the lock mechanism and a portion of the cylinder, the view showing the reverse side of said mechanism from that seen in Fig. 1. Figs. 12, 13, 14, 15 are different views of the safety-stop devices connected with the firing-pin or hammer. Fig. 16 is a transverse section on line 9 9, Fig. 1, showing a rear view of the breech-block. Figs. 17 and 18 are respectively front and rear views of the cylinder.

The lock or firing and cylinder-operating mechanism is inclosed in a metal frame, A, into which the barrel N is screwed in the usual way. The latter will, in practice, be made in two parts, of about equal length, and connected by a suitable screw-joint, so that one may be detached from the other to allow the gun to be packed in a short box, valise, or portmanteau for convenience of transportation. For the same reason the front end of the butt is hinged to the frame A, so that it may be folded underneath the cylinder and barrel, as indicated by dotted lines, Fig. 1. The joint is formed by means of a pintle, B, and three lugs, two of which are constructed on the iron constituting a rear extension of the lock-frame A, and one on the iron C, attached to the butt. The lugs on the lock-frame are slotted radially, so that just before the butt is completely folded the pintle B may pass out of the slots and the butt be detached, if preferred. The butt is held firmly in position for firing the gun, as shown in full lines, Fig. 1, by means of a spring-hook, E, which engages a corresponding hook or shoulder of the frame A. These parts are held engaged by a set-screw, D, inserted transversely through the small or hand of the gun-stock, so as to act on the head or free end of the hook, as will be readily understood.

The cylinder H has six chambers, which are made large enough to receive center-fire cartridge-shells of sufficient capacity to contain an ordinary shot-charge. The cylinder rotates on a short axial-pin, I, which enters its front end and extends nearly through it, and on a cylindrical pin or block, Q, which enters a socket in its rear end. A spiral spring, L, is placed in the front axial cavity, encircling a reduced portion of the pin I, and acting against a shoulder thereof for the purpose of forcing the cylinder back or away from the barrel N, as and for a purpose to be presently explained.

A recoil-shield or breech-block, M, is arranged in rear of the cylinder H, and moves backward and forward with the latter, but is prevented from rotating by a stop-screw, $a'$, fitting in a groove in its upper edge, Figs. 1 and 11. The breech-block has a tubular axial extension on its rear side that fits in the transverse diaphragm of the metal frame A. The aforementioned cylindrical block Q works in this tubular extension or sleeve, and has on its forward end a fixed radial pin, $Q'$, which enters a recess or notches formed in the edge of the socket in the cylinder, so that the cylinder and pin $Q'$ must rotate together, but may be readily separated when it is desired to charge the cylinder or remove it from its place.

A ratchet-ring, R, having six teeth, is attached to the rear end of the block Q, and a hand or lever, V, intermittently engages them to cause corresponding rotation of the cylinder H, as hereinafter more particularly described.

The cylinder H is locked in position so that it cannot rotate by means of a sliding pin, 10, that works through the lower portion of the diaphragm and breech-block and enters holes 17 in the cylinder.

A small firing-pin, $s$, works in the upper portion of the breech-block M, and is acted on by a sliding hammer, $f$, whose reduced end $k$ works through the diaphragm.

The rear end, $p$, of the barrel is beveled circumferentially on its outer and inner edge, $p'$, so that it is wedge-shaped in cross-section, as clearly shown in Fig. 2. The end of such wedge is notched or cut away circumferentially on each side, thus producing two circular shoulders, and the extremity $p^2$ is beveled like the body or main portion of the wedge. The end P $p^2$ of the barrel fits accurately in any one of the six circular cavities O in the front end of the cylinder, one being formed concentrically around the mouth of each chamber or bore. The gun cannot be fired, except when the cylinder is forced hard up against the barrel N, as shown in Fig. 1, in which case the annular wedge P fits closely in a corresponding cavity in the cylinder, thus forming a tight joint, through which the gases evolved by combustion of the powder cannot escape laterally between the barrel and cylinder, as it is liable to do in guns of this class. In brief, such joint, being gas-tight, enables them to be fired with perfect safety, thereby overcoming the greatest difficulty and danger heretofore incident to the use of guns of the revolver type.

I will now proceed to describe with sufficient detail the construction and operation of the mechanism for actuating and locking the cylinder and discharging the cartridges. For convenience I will describe the several coacting parts in the following order: first, the devices for locking and releasing the cylinder; second, the safety-stop for the firing-pin or hammer; third, the toggle-arms for forcing the cylinder forward to its place just previous to each discharge; fourth, the means for rotating the cylinder intermittently; fifth, the cam and tumbler for actuating the hammer; sixth, the tripping devices; seventh, general or combined operation of the whole mechanism. The operation of all these parts or devices depends upon and is caused by the pull-trigger X, which is bent at an angle of about forty-five degrees, and pivoted at its angle $d$, so as to have the usual vibratory motion in a vertical plane.

First. When the trigger X is drawn back the locking-pin 10 is drawn back from engagement with the cylinder H by means of a pivoted hook, 14, which is pivoted to the trigger and held engaged with said pin by a spring, 4. Before the trigger reaches the limit of its backward movement the hook is disengaged from the pin 10 by reason of riding up on a cross-pin, 15, Fig. 1, the under side of the hook having an inclined or cam surface for the purpose. The locking-pin 10 is then forced forward by its encircling spring 11, and strikes the end of the cylinder H when it has completed one-twelfth of a revolution, or moved half the distance required to bring the next chamber in line with the barrel N.

Second. The hammer $f$ is arranged lengthwise parallel to the upper side of the lock-frame A, and its rear end works through the rear portion of the latter. It is held retracted by a spring, $g$, which encircles its rear portion within the lock-frame. The portion adjacent to the reduced part $k$ has a square shoulder, which abuts against the stop-pin $r$, which works transversely through the side of the lock-frame A, as shown in Fig. 15, and is held normally thus engaged with the hammer $f$ by a spring, $r^5$. The function of this stop is to prevent accidental discharge of the gun by contact of any object with the rear or projecting end of the hammer. The stop is moved back, as shown in dotted lines, Fig. 15, by a cam, $r^4$, Figs. 13, 14, formed on a rod, $r'$, pivoted to an arm, $r^2$, Fig. 11, of the trigger. The rod $r'$ works through a slot in the pin $r$, and the cam $r^4$ acts on a beveled portion of the pin, so as to force it back when the rod is drawn down.

Figure 9:
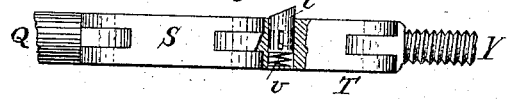
Figure 10:
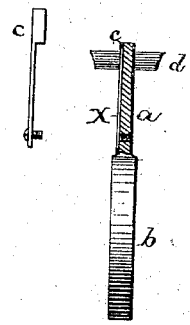

Third. The means for forcing the cylinder forward against the stress of its retracting-spring L are the toggle-arms S and T. They are normally in horizontal alignment with the axis of the cylinder H, as shown in full lines, Figs. 1, 10, in which position they are held by a spring, 3, being prevented from dropping below such line by a suitable fixed stop or support, forming an attachment of the lock-frame. The rear toggle-arm, T, is pivoted to a screw, Y, which is screwed into a nut, Z, having a cylindrical head provided with openings or cavities to receive the prongs of a wrench. The nut Z is held in a cylindrical socket, $Z''$, formed integrally with the lock-frame A, and allowed freedom of rotation, but prevented from lengthwise movement by means of the set-screws $Z'$, that enter a circumferential groove in the nut. By adjusting the nut Z compensation may be made for wear of the joint between the cylinder and barrel and the toggle-arms, &c. The front end of the arm S is pivoted to a pin, S', that fits and is free to rotate in a socket formed in the block Q. The rear pivot-pin of the arm T is elongated and works in a horizontal groove in the lock-frame, Fig. 3, thus preventing the rotation of the toggle-arms on their axis, but allowing their free movement vertically. A stud or lug, $t$, projects laterally from one side of the arm T, Fig. 9, and with this the cam end $a$ of the trigger comes in contact, Figs. 3 and 11, when the latter is drawn back, thus raising the toggle-arms S T so that they assume the angle shown in dotted lines, Fig. 1, which allows the spring L to force the cylinder H and its breech-block M backward so as to free the barrel N. When the trigger end $a$ passes this stud $t$ the spring 3 instantly forces the toggle-arms back into alignment, and, consequently, carries the cylinder and breech-block forward again. To allow this operation the cam end $a$ of the trigger must repass the stud $t$; and to this end the stud is beveled, as shown in Fig. 9, and is also adapted to slide in a transverse hole or socket in the arm T, being held normally projected beyond the side of the arm by means of a spiral spring, $v$, and its movement limited by a pin and slot. After the cam end $a$ of the trigger has passed the stud $t$, as stated, it is thrown back to its original position by spring 1, and in such movement it rides over the bevel of the stud and presses it inward, while the stress of the spring $v$ at once forces it out again when the trigger has passed, so as to be in readiness for the next operation of the trigger.

Fourth. The above-described operation of the toggle-arms S T causes the hand or lever V to rotate the cylinder H at the right moment—that is to say, as soon as it is free of the barrel N. Such lever is pivoted to screw Y, along with arm T, Figs. 1, 3, and projects forward far enough to engage the ratchet-ring R on pivot-block Q, which it does shortly after the toggle-arms S T have begun to rise. This action is due to the fact that the pivot-pin $x$, that connects arms S T, projects through a vertical slot in the lever V, as shown in Fig. 1, so that the lever must partake of the movement of the arm T as soon as the pin $x$ reaches the upper limit of the slot. After the hand V has been thus raised and has actuated the cylinder H it is drawn down with the arm T through the action of the spring 3, before referred to.

Fifth. The tumbler $e$, for forcing the sliding hammer $f$ forward to fire the gun, is a curved lever pivoted at $e^3$ above the trigger-fulcrum $d$, and connected by a link, 2', with a strong spring, 2. In Figs. 4, 5, 6, 7, 8, 10 I have illustrated, in detail, the construction and connection of this tumbler and trigger and attached parts. When the trigger is pulled a cam, $c$, projecting from the angle of the trigger acts on the lower arm, $e^4$, of the tumbler $e$, or, rather, on a friction-roller attached thereto, and vibrates the tumbler, whose nose is thus caused to move back past the beveled spring-pin $k'$, placed in a recess in the sliding hammer $f$. The spring-pin is thus forced in, but instantly projects again so soon as the nose of the tumbler $e$ has passed over it; at which instant the trigger-cam $c$ also slips out of engagement with the tumbler $e$, thus leaving the latter free to be actuated up to the full power of the spring 2 the moment it is released by the sear $l$. When thus released the nose of the tumbler $e$ presses against the pin $k'$ and pushes the hammer $f$ forward with the force requisite to cause the pin $s$ to explode the cartridge in the cylinder. So soon as the hammer has made its stroke the spring $g$ retracts it to its former position. (Shown in full lines, Figs. 1, 11.) It is, however, apparent that the cam $c$ must pass the tumbler $e$ when the latter thus actuates the hammer $f$. To allow this I provide the cam with a spring-shank and rivet it in a recess or groove in the longer arm of the trigger X. The cam $c$ is beveled (Fig. 8) on its inner side, and will hence spring out laterally and pass around the beveled lower end of the tumbler $e$ as the latter makes its rapid reverse movement.

Sixth. The sear $l$ is adapted to engage the half-cock or full-cock notch (Fig. 6) of the tumbler $e$ in the usual way, and is connected by rod $m$ with the trip-trigger $n$, which is pivoted at $o$ in rear of the larger pull-trigger. The trip-trigger may be operated independently, as hereinafter described; but a dog, $p$, is attached to the pull-trigger in such position that when the latter is drawn back it will strike the trip-trigger $n$, and thus prevent the sear $l$ catching and holding the tumbler $e$.

Seventh. The operation of the mechanism as a whole, whose component parts have now been described, is as follows: Supposing the cylinder to be charged with cartridges and the index finger inserted in the ring $b$ of the trigger X, and the latter pulled back to the limit indicated in dotted lines, Fig. 1, the following movements will take place simultaneously, to wit: first, the locking-pin 10 will be drawn back, thus releasing the cylinder H, so that it will be free to rotate; second, the safety-stop $r$ will be drawn back to leave the hammer $f$ free; third, the toggle-arms S T will be raised into the position shown in dotted lines, Fig. 1, thus drawing back the breech-block M and cylinder H until the cylinder is free of the end P of the barrel; fourth, soon after the toggle-arms S T have begun this movement the hand V will act on the ratchet R and rotate the cylinder one-sixth of a revolution, this motion being made while the toggle-arms hold the cylinder retracted; but when the cylinder H has rotated half this distance—to wit, one-twelfth of a revolution—the spring-pin 10 is released and shoots forward, so that its front end presses against the cylinder in readiness to enter the next hole, 17, therein and catch and lock the cylinder for the next discharge; fifth, the cam $c$ acts on the tumbler $e$ and throws it into engagement with the pin $k'$ of the sliding hammer $f$; sixth, the sear $l$ will then be tripped to release the tumbler $e$ and allow the hammer to fire the gun. But it is to be noted the dog $p$ can only trip the firing-trigger $n$ when adjusted horizontally, as shown in full lines, Fig. 1, for only then does it project toward the rear; hence when turned up into vertical position, as in dotted lines, Fig. 1, it cannot operate the trigger $n$, and it is held in either position by a spring, $q$, that acts on its angular end. The former—to wit, the horizontal position—is the one required for rapid firing, since nothing more is then necessary than to pull the trigger X, and at every pull the gun will be discharged. When the dog $p$ is in vertical position the firing mechanism may be set without tripping by pulling the trigger X. Then, while the latter is held drawn back, the gun may be fired at leisure by tripping the trigger $n$ with the second finger of the hand.

It will be noted that the stop $r$ prevents any movement of the hammer $f$, except that caused by the trigger X; but I provide a means for locking it, so that it cannot be operated even by said trigger, thus enabling the gun to be handled or transported, when loaded, with absolute safety. Said means consist of a set-screw, $h$, Figs. 1, 11, which works through the lock-frame A, and is adapted to enter a recess in the hammer $f$. When in the position shown in full lines its point enters a lengthwise groove, $i$, so that the hammer is free to reciprocate.

The breech-block M being prevented from rotation by the screw $a'$, it is necessarily provided with a hinged section, as shown in Fig. 16, which is opened to allow extraction of the spent shells and insertion of charged shells. In such case the gun is brought to full-cock, thus bringing the cylinder H back far enough to be free of the end P of the barrel, when the cylinder is pushed forward by hand a small fraction of an inch to clear the pin $Q'$ of pivot-block Q, which being done, the cylinder may be rotated.

I design providing two attachments for the barrel N—to wit, a choker and also a rifled section—each of which will be adapted for attachment to the muzzle by a screw-joint. The choker or contracted muzzle-piece will be used for concentrating the shot-charge and the rifled section to practically convert the gun into a rifle.

In place of constructing the cylinder with recesses to receive the end of the barrel, the cylinder may be provided with annular projections and the barrel with a recess to receive them.

I do not claim, broadly, providing a revolving cylinder with a recess to receive the projecting end of the barrel, nor the operation of the cylinder by means of toggle-arms and pawl-and-ratchet mechanism.

What I claim as new is—

1. The combination of the revolving cylinder adapted for lengthwise movement, and provided with a series of annular sockets or recesses, which are formed in its front end concentrically with its respective bores or cartridge-chambers, and the barrel whose rear end is beveled and adapted to fit accurately in said sockets, substantially as shown and described, for the purpose of forming a gas-tight joint, as specified.

2. The revolving cylinder adapted for lengthwise movement and having a series of annular cavities or recesses in its front end, each of which is concentric with the mouth of a bore or cartridge-chamber, in combination with the barrel whose rear end is beveled and shouldered, thus forming the double annular wedge adapted to fit closely in the correspondingly-shaped sockets, as shown and described, for the purpose specified.

3. The combination, with the revolving cylinder and a sliding breech-block therefor, of the rear axial pivot-block, Q, which enters a socket in the cylinder, and is adapted for longitudinal movement, and provided with a pin or radially-projecting portion that locks it with said cylinder, as shown and described.

4. The combination of the revolving cylinder, the non-rotating breech-block or recoil-shield which slides therewith, the block Q, passing through the recoil-shield and engaging with the cylinder, and provided with the ratchet, and the rotating hand or pawl, substantially as shown and described.

5. The combination, with the revolving and sliding cylinder, of the rear axial pivot-block, Q, having an annular ratchet, R, on its rear end and the radial pin $Q'$ on its front end, the breech-block having a central rear tubular extension in which said pivot-block is fitted, and a spring and toggle mechanism for retracting and rotating the cylinder and forcing it forward to its place, substantially as shown and described.

6. The combination, with the revolving cylinder and vibrating trigger, of a horizontally-sliding spring-pin for locking said cylinder, and a cam-catch, 15, which automatically engages and releases the pin, substantially as specified.

7. The combination, with the sliding hammer, of the spring stop-pin $r$, adapted to slide and engage said hammer, as specified, the rod $r'$, having a cam that operates the stop-pin, and the trigger to which said rod is pivoted, as shown and described, whereby the stop is operated to release the hammer when the trigger is pulled, as specified.

8. The combination, with the toggle-arms and spring 3, the sliding cylinder, and its retracting-spring, of the trigger X, whose cam end $a$ raises the arms, then releases them, and allows the spring to throw them back to the horizontal position, as and for the purpose specified.

9. The combination, with the toggle-arms and spring 3 for throwing and holding them down, of the trigger X, having cam end $a$, and a spring-pin, $t$, which is attached to one of said arms and provided with a beveled head, the trigger being arranged with reference to said pin, as specified, so that when pulled it will press on the latter and raise the toggle-arms until free of the pin, when the arms will be thrown down and the cam end of the trigger then pass back over the pin, whose spring allows it to recede into its socket, as shown and described.

10. The combination, substantially as described, of the sliding hammer provided with a spring-pin, $k'$, and a retracting-spring, a spring-actuated pivoted tumbler adapted to successively engage with, force forward, and release the hammer, and the trigger having a cam attachment which acts on the tumbler, as specified.

11. The combination, with the sliding hammer having a lateral spring-pin, $k'$, of the spring-actuated tumbler adapted to engage with and release the latter, the trigger, and a cam which is attached thereto and adapted for lateral movement to allow it to repass the tumbler after setting it, substantially as hereinbefore set forth.

R. P. CORY.

Witnesses:
SOLON C. KEMON,
AMOS W. HART.